Aug. 18, 1970     A. C. WORLEY     3,524,467

FLUID EXPANDED DISK VALVE

Filed Oct. 13, 1967     2 Sheets-Sheet 1

Arthur C. Worley INVENTOR

BY

ATTORNEY

3,524,467
FLUID EXPANDED DISK VALVE

Arthur C. Worley, Mendham Township, Morris County, N.J., assignor to Esso Research and Engineering Company, a corporation of Delaware
Filed Oct. 13, 1967, Ser. No. 675,083
Int. Cl. F16k *49/00, 25/00*
U.S. Cl. 137—340                2 Claims

ABSTRACT OF THE DISCLOSURE

A valve assembly for use in a pipeline comprises a pair of spaced and expandably connected disks adapted to be expanded by fluid means against seats arranged around the inside periphery of the pipe.

BACKGROUND

This invention relates to a control device adapted to control the flow in a pipeline and is particularly adapted for use in low pressure, large diameter lines carrying flue gas with low solids entrainment.

In the usual operation of such lines the pressure is generally less than one p.s.i.g. and the piping is arranged so that flue gas can be directed either through waste heat boilers, carbon monoxide boilers, solids, precipitators, etc., or in an emergency to a bypass stack. During flow to the bypass stack the equipment is repaired or inspected. To permit switching the gas stream during operation, it is usual to use butterfly damper valves and water seal tanks or special two-part alloy steel valves. These latter valves are expensive and do not give tight shut off and a leakage rate of 5% of flow is common. In order to prevent carbon monoxide leakage during repair of blanketed equipment steam is injected into the seat of the blanketed port.

Seal tanks require a water addition and withdrawal system and employ a damper upstream to reduce the water wave action in the seal tank during a switching operation. In view of the piping size and the large seal tanks considerable space is required for installation of the system. The internals of the seal tanks require frequent maintenance since a severe thermal shock takes place each time flue gas flow is changed because of the great temperature differential between the water (80° F.) and the gas (1200° F.)

The present invention overcomes these difficulties and requires minimum space for installation.

SUMMARY

This invention relates to a disk valve using fluid pressure for seating the valve disks against the body seats and comprises two end disks coupled by an expansion joint adapted to be expanded by fluid pressure. The disk assembly is adapted to be lowered from a bonnet into the path of a flowing stream in a conduit so that upon application of fluid pressure between the disks the flow of the stream is completely stopped. The fluid under pressure may also double as cooling means.

BRIEF DESCRIPTION OF DRAWINGS

Reference will now be had to the accompanying drawings wherein the same reference characters are used to designate corresponding parts in the several figures.

DETAILED DESCRIPTION

Figure 1:
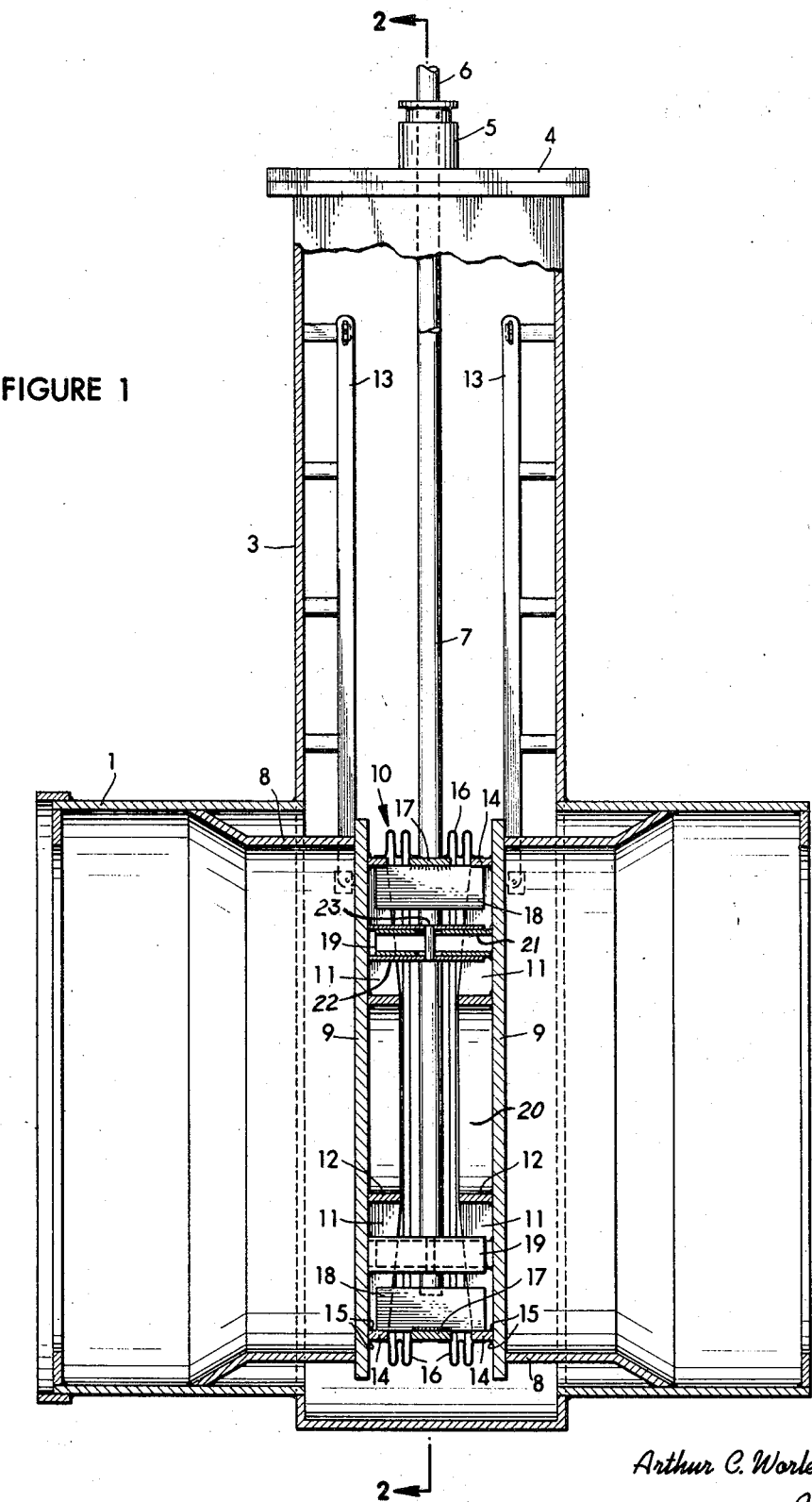
FIG. 1 is a cross-section showing the valve with disks in lowered position.
Figure 2:
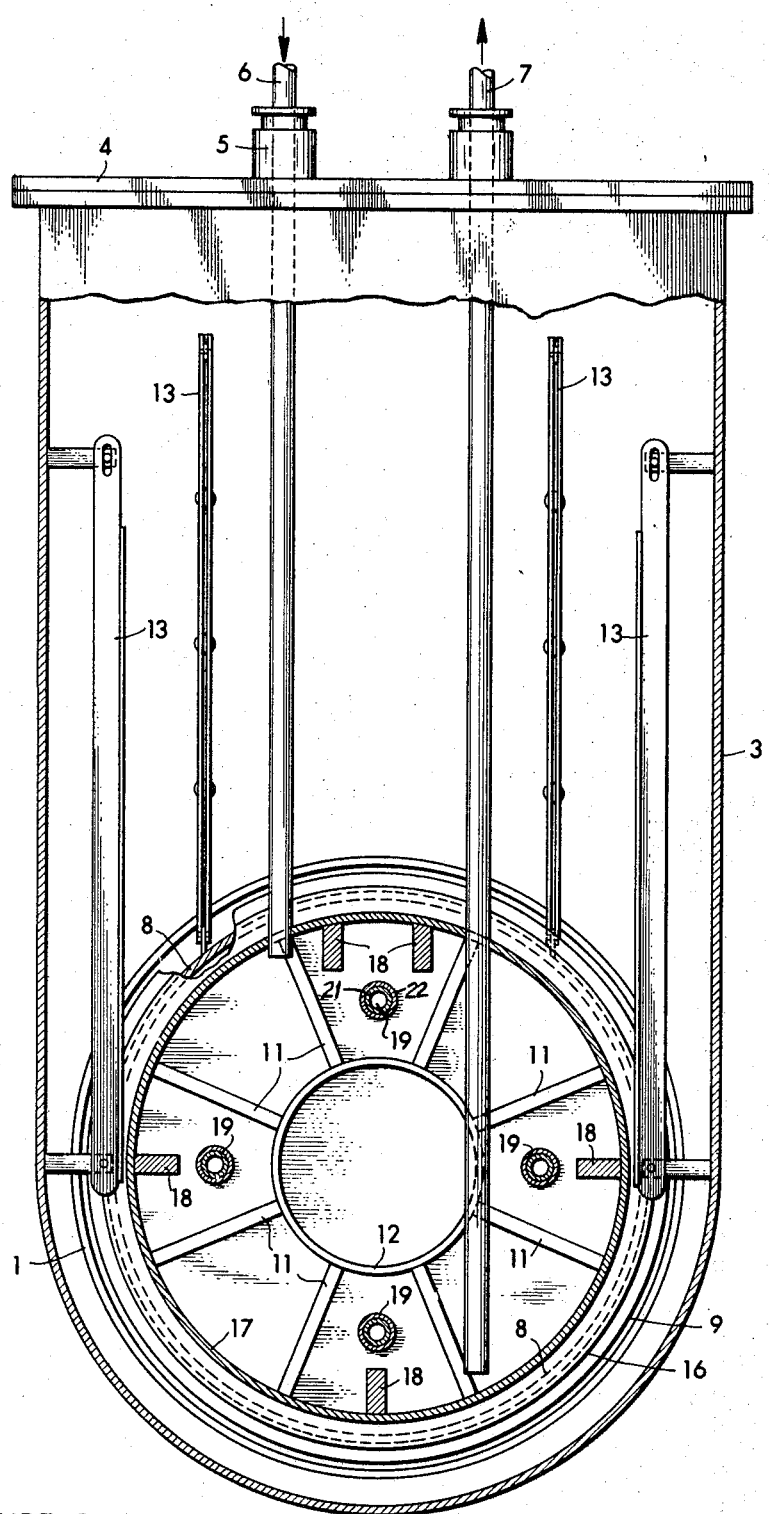
FIG. 2 is a cross-section taken along line 2—2 of FIG. 1, also showing the valve with disks in lowered position.

Referring now to the drawings a valve body 1 adapted to be connected to a pipeline is fitted with a bonnet 3 having end plate 4. A stuffing box 5 is placed atop bonnet 3 and an inlet pipe 6 passes through the stuffing box 5, bonnet 3 and into gate assembly 20. An outlet pipe 7, leading from the lower part of gate assembly 20, is also provided.

Valve body 1 is shown provided with seats 8 in juxtaposition with which are disks 9 and expansion elements 10. Disks 9 are provided with stiffening ribs 11 connected to circular rib 12 arranged so as to strengthen the disks. Disks 9 are adapted to be actuated by fluid pressure entering through pipe 6. When the fluid pressure is applied the disks 9 expand against the seats 8. The expansion elements 10 may be any conventional means but may conveniently comprise cylinders 14 welded directly to disks 9 at points 15 to form a flanged disk to which are attached bellows 16 connected in turn with center cylinder 17. Welded to center cylinder 17 but not to cylinders 14 are bars 18 adapted to carry the weight of the entire assembly when it is lifted into the bonnet. A series of guides 13 are provided to keep the disks in alignment and thereby prevent lateral stress to be placed on the expansion elements 10. If desired, the disks 9 can be removed from pipe 1 and withdrawn into bonnet 3 by any means (not shown) such as a chain pull, hydraulic pressure operator and the like.

The fluid introduced through line 6 for expanding disks 9 against the seats 8 may also be used to cool the disk-expansion joint assembly by venting part of the fluid through line 7. Gas, steam or liquid or a combination of these may be used as the expansion medium. Cooling is particularly desirable when the disk assembly is used in a line operating at elevated temperature. By cooling the line would be less subject to thermal distortion and could be made from lower cost material, such as carbon steel.

Guides 19, each consisting of two telescoping cylinders with one end of each cylinder welded to disks 9, have been provided to insure that disks 9 expand or contract in parallel alignment and to avoid skewing. Guides 19 include a pair of telescoping tubes 21 and 22 having one end of each tube attached, as by welding, to the internal surface of the opposing disks 9. The inner tube 21 is slotted longitudinally so as to engage a pin 23, passing through the slot and connected to the outer tube of the guide assembly 19. The length of the slot limits the degree of expansion or contraction that the bellows may be subjected to without causing damage.

The nature of the present invention having thus been fully set forth and examples of the same given, what is claimed as new, useful and unobvious and desired to be secured by Letters Patent is:

1. A gate valve assembly comprising:
   (A) A valve body:
      (1) said body having inlet and outlet connections opposite one another;
      (2) each said connection including a tapered section terminating in valve seats;
   (B) A bonnet:
      (1) said bonnet having a lower end connected to and in communication with said body adjacent said valve seats and an upper end including a pair of stuffing boxes;
   (C) A hollow gate assembly, said gate assembly including:
      (1) a central cylinder;

(2) a plurality of transverse supporting bars attached to and projecting beyond said central cylinder;
(3) a pair of parallel tubes adapted to carry fluid into and out of said hollow gate assembly;
(4) said parallel tubes having their lower ends passing through and connected to said central cylinder and their upper ends passing through said stuffiing boxes in communication with the outside of said valve body;
(5) a pair of disks each provided with a flange;
(6) said disks reinforced against planar flexure by a plurality of circular and radial ribs;
(7) said flanges having an internal diameter so as to permit slidable movement over the projecting ends of said transverse supporting bars;
(8) a pair of cylindrical bellows disposed between said central cylinder and said flanges and connected to each respectively to form a fluid-tight compartment; and
(9) means for limiting the expansion and contraction of the bellows by the application and reduction of fluid pressure respectively from an outside source supplied through said parallel tubes, said limiting means comprising a plurality of pairs of telescoping tubes attached to the internal faces of said flanged disks including a slot in the inner tube engaging a pin fastened to the outer tube.

2. A gate valve according to claim 1 wherein a portion of the fluid passing through the parallel tubes into and out of the hollow gate assembly is vented so as to cool said hollow gate assembly when under pressure.

References Cited

UNITED STATES PATENTS

| | | | |
|---|---|---|---|
| 1,563,605 | 12/1925 | Willcox et al. | 137—340 |
| 1,995,727 | 3/1935 | Wetherbee | 137—340 |
| 2,331,465 | 10/1943 | Fox | 137—340 |
| 2,448,706 | 9/1948 | Edwards | 251—175 |
| 2,476,711 | 7/1949 | Edwards | 251—175 |
| 2,582,877 | 1/1952 | Mekler | 251—175 |
| 3,206,162 | 9/1965 | Bogot | 251—175 XR |
| 2,819,034 | 1/1958 | Holderer | 257—175 XR |
| 2,825,528 | 3/1958 | Truitt | 251—175 |
| 2,993,502 | 7/1961 | Van Aken et al. | 251—175 XR |

FOREIGN PATENTS 711,187  9/1941  Germany.

ROBERT R. MACKEY, Primary Examiner

U.S. Cl. X.R.

251—175